(12) United States Patent
Gaffney et al.

(10) Patent No.: US 10,814,973 B2
(45) Date of Patent: Oct. 27, 2020

(54) AIRCRAFT HAVING M-WING AND GULL WING CONFIGURATIONS

(71) Applicant: Textron Innovations Inc., Providence, RI (US)

(72) Inventors: Sean Robert Gaffney, Copley, OH (US); Robert Rex Graham, Jr., Agua Dulce, CA (US); Colton Edward Campbell, Prescott, AZ (US); Kevin Krisnil Prasadk, Las Vegas, NV (US); Isaiah Neves Martinez, Rio Rancho, NM (US); Jared Michael Rosenkrance, Prescott, AZ (US); Lukas N. Everhart, Wolcottville, IN (US); William Paul Crisler, Prescott Valley, AZ (US)

(73) Assignee: Textron Innovations Inc., Providence, RI (US)

( * ) Notice: Subject to any disclaimer, the term of this patent is extended or adjusted under 35 U.S.C. 154(b) by 330 days.

(21) Appl. No.: 15/956,282

(22) Filed: Apr. 18, 2018

(65) Prior Publication Data

US 2019/0322365 A1    Oct. 24, 2019

(51) Int. Cl.
*B64C 29/02*    (2006.01)
*B64C 3/56*    (2006.01)
(Continued)

(52) U.S. Cl.
CPC ............ *B64C 29/02* (2013.01); *B64C 3/10* (2013.01); *B64C 3/16* (2013.01); *B64C 3/42* (2013.01);
(Continued)

(58) Field of Classification Search
CPC ..... B64C 2201/103; B64C 29/02; B64C 3/56; B64C 3/16; B64C 3/42; B64C 3/546; B64C 37/02
See application file for complete search history.

(56) References Cited

U.S. PATENT DOCUMENTS 3,226,056 A * 12/1965 Holland, Jr. ............ B64C 37/02
244/2
3,954,231 A * 5/1976 Fraser ....................... B64C 3/16
244/225

(Continued)

OTHER PUBLICATIONS

Anderson, C.E; Wingtip Coupling at 15,000 Feet—Dangerous Experiments; Flight Journal, Dec. 2000.

*Primary Examiner* — Richard R. Green
*Assistant Examiner* — William L Gmoser
(74) *Attorney, Agent, or Firm* — Lawrence Youst PLLC

(57) ABSTRACT

An aircraft includes a fuselage coupled to a wing having a dihedral root section with first and second outboard sections pivotably coupled to respective outboard ends thereof. A thrust array is coupled to the wing. A power system is operably associated with the thrust array to provide power to each of a plurality of propulsion assemblies. A flight control system is operably associated with the thrust array and the wing. The flight control system is operable to control the thrust output from the propulsion assemblies and the configuration of the wing. In a thrust-borne vertical lift mode, the wing has an M-wing configuration with the center of gravity of the aircraft located between the outboard sections of the wing. In a wing-borne forward flight mode, the wing has a gull wing configuration with the center of gravity of the aircraft located below the outboard sections of the wing.

20 Claims, 11 Drawing Sheets

(51) Int. Cl.
*B64C 3/10* (2006.01)
*B64C 39/02* (2006.01)
*G05D 1/08* (2006.01)
*G05D 1/10* (2006.01)
*B64C 3/42* (2006.01)
*B64C 3/54* (2006.01)
*B64C 3/16* (2006.01)

(52) U.S. Cl.
CPC ............... *B64C 3/546* (2013.01); *B64C 3/56* (2013.01); *B64C 39/024* (2013.01); *G05D 1/0858* (2013.01); *G05D 1/102* (2013.01); *B64C 2003/543* (2013.01); *B64C 2201/088* (2013.01); *B64C 2201/102* (2013.01); *B64C 2201/108* (2013.01); *B64C 2201/141* (2013.01); *B64C 2201/146* (2013.01); *B64C 2201/165* (2013.01); *B64C 2201/18* (2013.01)

(56) References Cited

U.S. PATENT DOCUMENTS

| | | | |
|---|---|---|---|
| 5,395,073 A * | 3/1995 | Rutan | B64C 3/385 244/38 |
| 9,550,567 B1 | 1/2017 | Erdozain et al. | |
| 2010/0051741 A1* | 3/2010 | Ismailov | B64C 39/024 244/13 |
| 2011/0036939 A1* | 2/2011 | Easter | B64C 5/02 244/2 |
| 2016/0023527 A1* | 1/2016 | Dietrich | B64C 3/56 244/2 |
| 2017/0283052 A1* | 10/2017 | Moshe | B64C 27/22 |
| 2017/0355442 A1* | 12/2017 | Winkelmann | F15B 15/02 |
| 2018/0155021 A1* | 6/2018 | Patterson | B64C 37/02 |
| 2019/0084664 A1* | 3/2019 | Nesti | B64C 23/069 |
| 2019/0176958 A1* | 6/2019 | Woodworth | B64C 3/24 |

\* cited by examiner

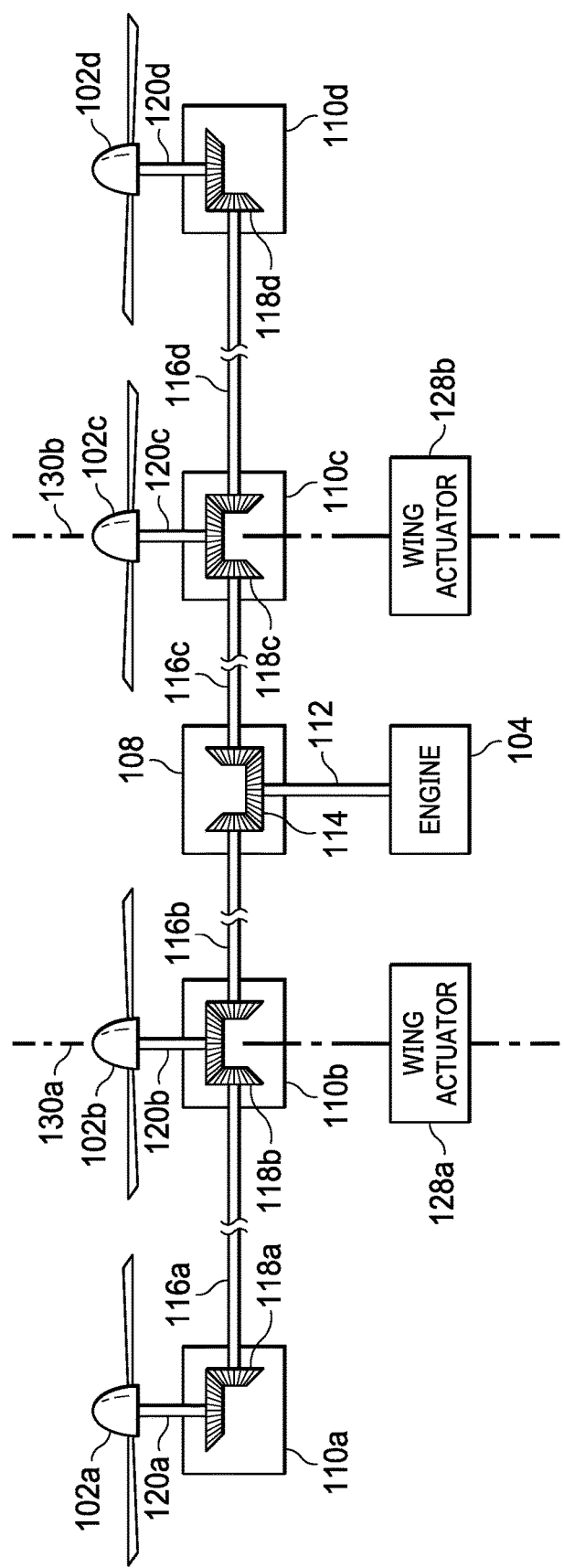
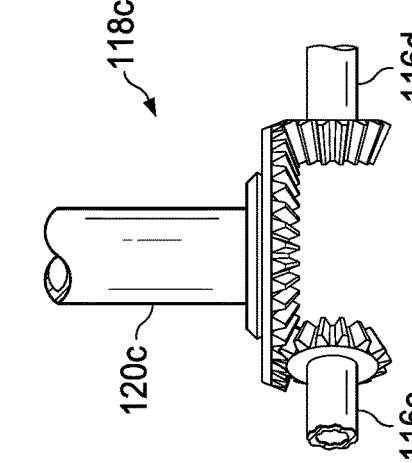
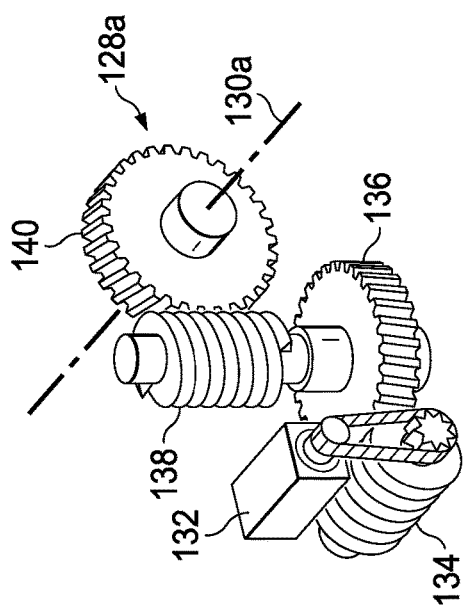
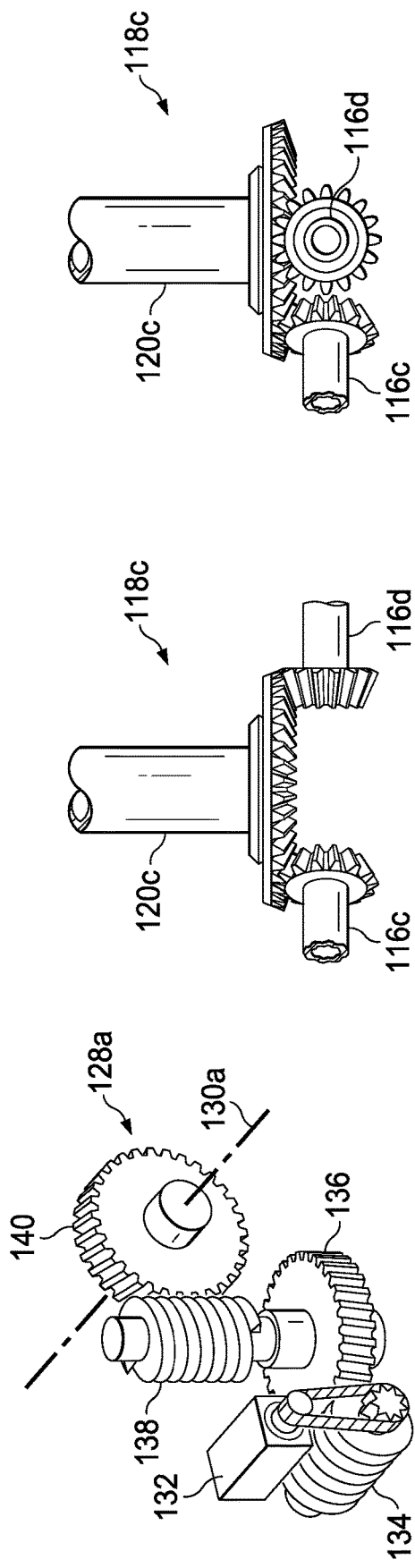

AIRCRAFT HAVING M-WING AND GULL WING CONFIGURATIONS

TECHNICAL FIELD OF THE DISCLOSURE

The present disclosure relates, in general, to aircraft operable to transition between thrust-borne vertical lift and wing-borne forward flight modes and, in particular, to aircraft having an M-wing configuration for vertical takeoff, hover and vertical landing and a gull wing configuration for forward flight.

BACKGROUND

Unmanned aircraft systems (UAS), also known as unmanned aerial vehicles (UAV) or drones, are self-powered aircraft that do not carry a human operator, uses aerodynamic forces to provide vehicle lift, are autonomously and/or remotely operated, may be expendable or recoverable and may carry lethal or nonlethal payloads. UAS are commonly used in military, commercial, scientific, recreational and other applications. For example, military applications include intelligence, surveillance, reconnaissance and attack missions. Civil applications include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few.

Fixed-wing aircraft, such as airplanes, are capable of flight using wings that generate lift responsive to the forward airspeed of the aircraft, which is generated by forward thrust from one or more jet engines or propellers. The wings generally have an airfoil cross section that generates the lift force to support the airplane in flight. Fixed-wing aircraft, however, typically require a runway for takeoff and landing. Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to takeoff and land. A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust.

SUMMARY

In a first aspect, the present disclosure is directed to an aircraft having a thrust-borne vertical lift mode and a wing-borne forward flight mode. The aircraft includes a fuselage and a wing that is coupled to the fuselage. The wing has a dihedral root section with first and second outboard ends. The wing also has a first outboard section that is pivotably coupled to the first outboard end of the dihedral root section and a second outboard section that is pivotably coupled to the second outboard end of the dihedral root section. A thrust array, including a plurality of propulsion assemblies, is coupled to the wing. A power system is operably associated with the thrust array to provide power to each of the propulsion assemblies. A flight control system is operably associated with the thrust array and the wing. The flight control system is operable to control the thrust output from each of the propulsion assemblies and operable to control the configuration of the wing. In the thrust-borne vertical lift mode, the wing has an M-wing configuration with the center of gravity of the aircraft located between the outboard sections of the wing near the resultant center of lift. In the wing-borne forward flight mode, the wing has a gull wing configuration with the center of gravity of the aircraft located below the outboard sections of the wing and located with respect to the center of lift such that the aircraft is longitudinally stable.

In some embodiments, the thrust array may include at least four propulsion assemblies. For example, the thrust array may include a first propulsion assembly positioned between the dihedral root section and the first outboard section of the wing, a second propulsion assembly positioned between the dihedral root section and the second outboard section of the wing, a third propulsion assembly positioned mid span of the first outboard section of the wing and a fourth propulsion assembly positioned mid span of the second outboard section of the wing. In such embodiments, the first propulsion assembly may be positioned at a pivot axis between the dihedral root section and the first outboard section of the wing and the second propulsion assembly may be positioned at a pivot axis between the dihedral root section and the second outboard section of the wing. In certain embodiments, the propulsion assemblies may have variable pitch rotor blades operable to change thrust output responsive to changes in rotor blade pitch and changes in rotational speed. In other embodiments, the propulsion assemblies may have fixed pitch rotor blades operable to change thrust output responsive to changes in rotational speed.

In some embodiments, the power system may include at least one internal combustion engine and a drive system that couples the at least one internal combustion engine with the plurality of propulsion assemblies. In such embodiments, the drive system may include a first beveled gear set positioned at a pivot axis between the dihedral root section and the first outboard section of the wing and a second beveled gear set positioned at a pivot axis between the dihedral root section and the second outboard section of the wing. In other embodiments, the power system may include at least one battery and a plurality of electric motors each of which may be operably associated with at least one of the propulsion assemblies. In further embodiments, the power system may be a hybrid power system that includes at least one internal combustion engine, at least one alternator driven by the at least one internal combustion engine and at least one battery charged by the at least one alternator.

In certain embodiments, in the thrust-borne vertical lift mode, the flight control system may be operable to control pitch, roll and yaw responsive to differential thrust output from the propulsion assemblies of the thrust array. In some embodiments, in the wing-borne forward flight mode, the flight control system may be operable to control yaw responsive to differential thrust output from the propulsion assemblies of the thrust array and the dihedral root section has a V-shape that adds aerodynamic surface to improve yaw stability. Additionally, in the wing-borne forward flight mode, the flight control system may be operable to control pitch and roll responsive to operation of aerosurfaces on the first and second outboard sections of the wing.

In certain embodiments, in the thrust-borne vertical lift mode, the outboard sections of the wing may each form an acute minor angle with the dihedral root section of the wing. In some embodiments, in the wing-borne forward flight mode, the outboard sections of the wing may each form an obtuse minor angle with the dihedral root section of the wing. In certain embodiments, during transitions from the thrust-borne vertical lift mode to the wing-borne forward flight mode, the wing transitions from the M-wing configuration to the gull wing configuration. In other embodiments, the wing may transition from the M-wing configuration to the gull wing configuration after the transition from the thrust-borne vertical lift mode to the wing-borne forward flight mode. In some embodiments, during transitions from the wing-borne forward flight mode to the thrust-borne vertical lift mode, the wing transitions from the gull wing configuration to the M-wing configuration. In certain embodiments, the flight control system may be a remote controlled flight control system, an autonomous flight control system or a combination thereof.

In a second aspect, the present disclosure is directed to a multi-aircraft system including at least first and second aircraft connectable wingtip-to-wingtip during flight. Each aircraft has a thrust-borne vertical lift mode and a wing-borne forward flight mode and each aircraft includes a fuselage and a wing that is coupled to the fuselage. The wing has a dihedral root section with first and second outboard ends. The wing also has a first outboard section that is pivotably coupled to the first outboard end of the dihedral root section and a second outboard section that is pivotably coupled to the second outboard end of the dihedral root section. A thrust array, including a plurality of propulsion assemblies, is coupled to the wing. A power system is operably associated with the thrust array to provide power to each of the propulsion assemblies. A female wingtip coupling assembly is disposed at the outboard end of the first outboard section. A male wingtip coupling assembly is disposed at the outboard end of the second outboard section. A flight control system is operably associated with the thrust array, the wing and the wingtip coupling assemblies. The flight control system is operable to control thrust output from each of the propulsion assemblies, wing configuration and wingtip coupling. In the thrust-borne vertical lift mode, the wing has an M-wing configuration with the center of gravity of the aircraft located between the outboard sections of the wing. In the wing-borne forward flight mode, the wing has a gull wing configuration with the center of gravity of the aircraft located below the outboard sections of the wing. In a connected flight mode, the female wingtip coupling assembly of the first aircraft is coupled to the male wingtip coupling assembly of the second aircraft.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2B-2E are schematic illustrations of mechanical systems of an aircraft having M-wing and gull wing configurations in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
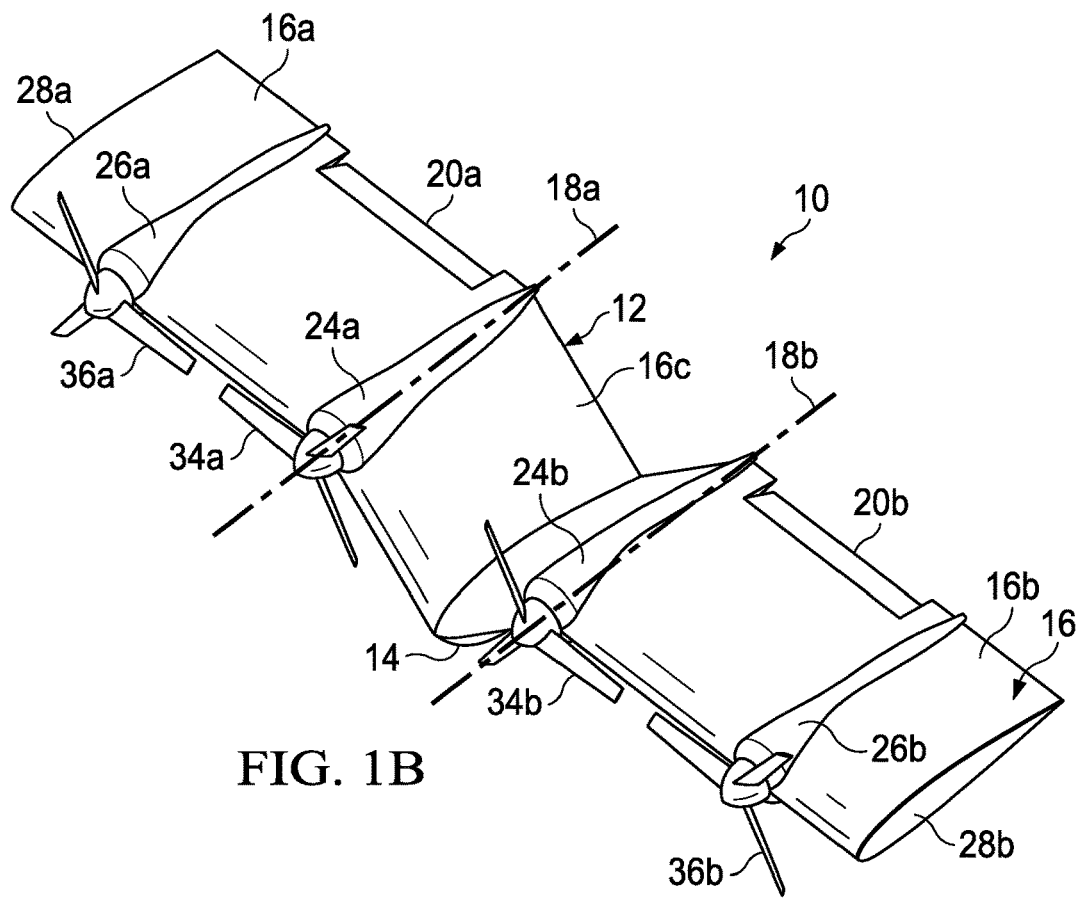
FIGS. 1A-1J are schematic illustrations of an aircraft having M-wing and gull wing configurations in accordance with embodiments of the present disclosure.
Figure 1A:
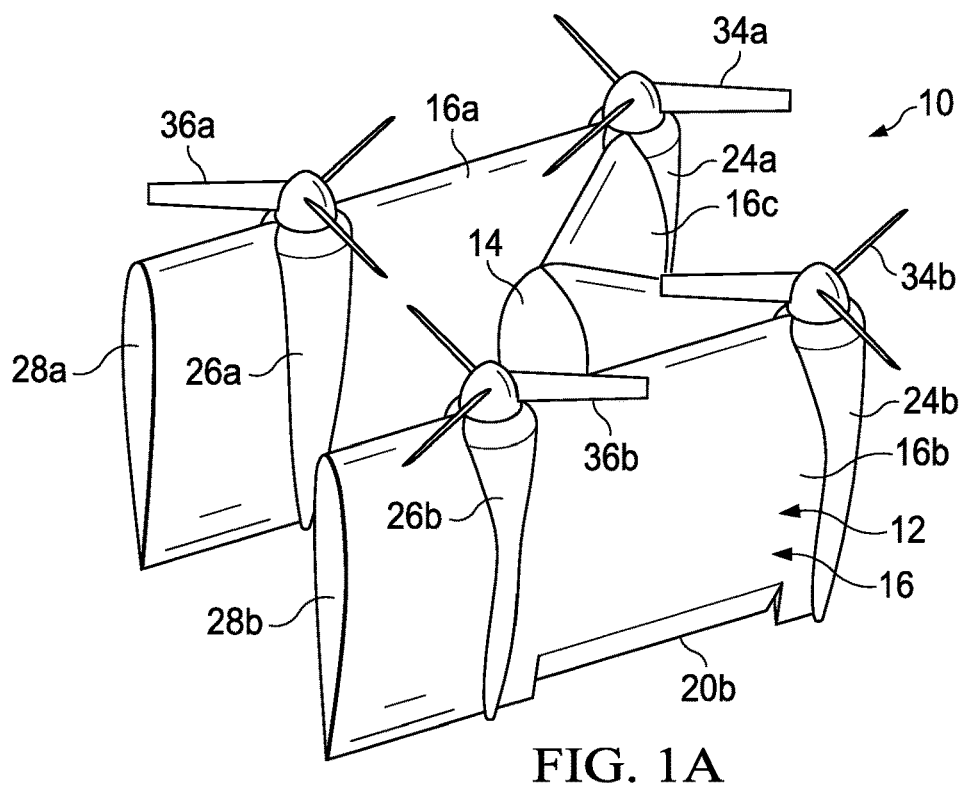
Figure 1D:
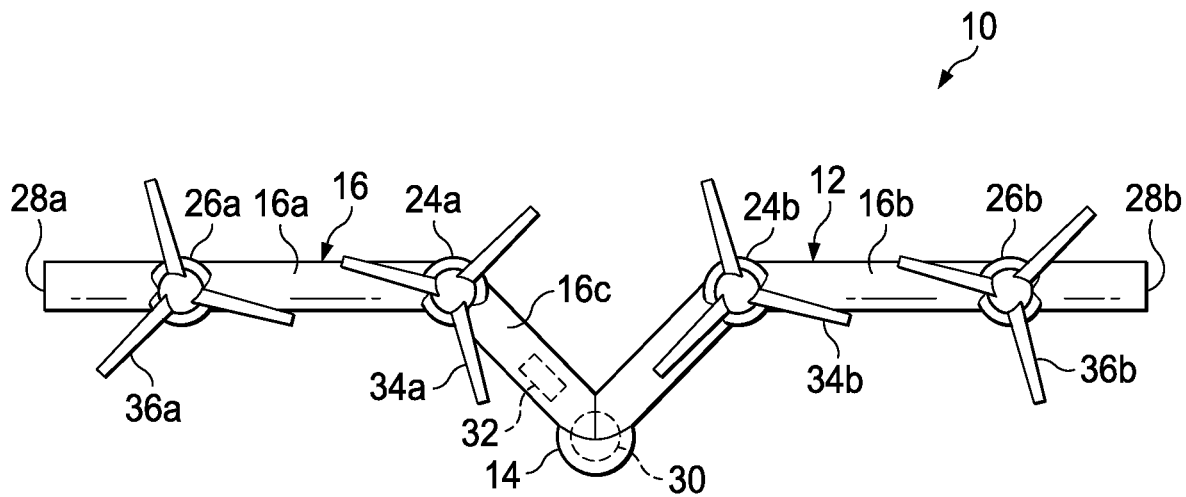
Figure 1C:
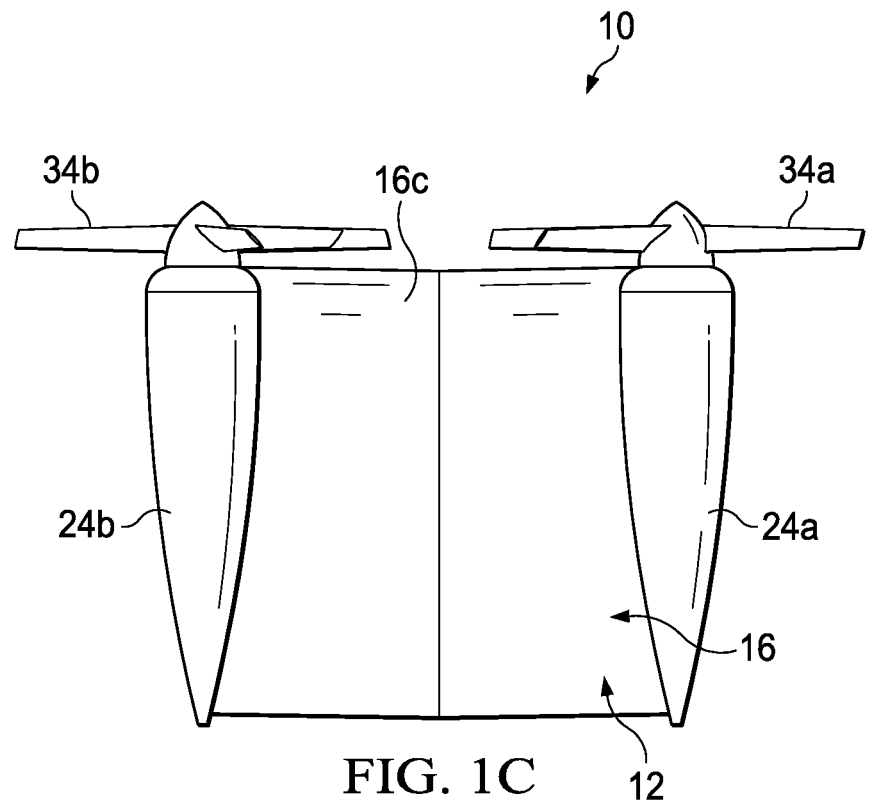
Figure 1F:
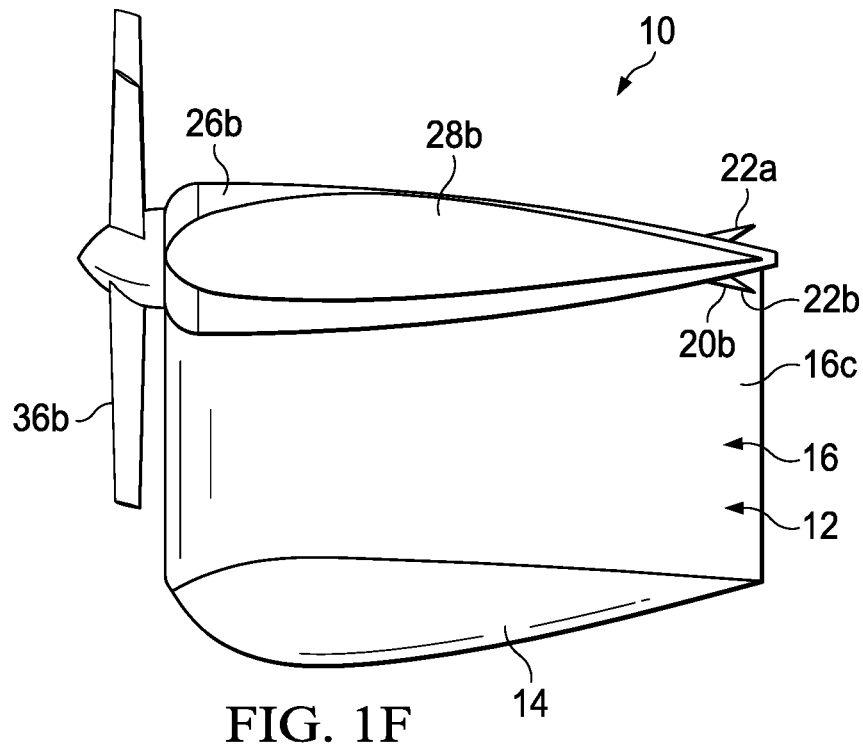
Figure 1E:
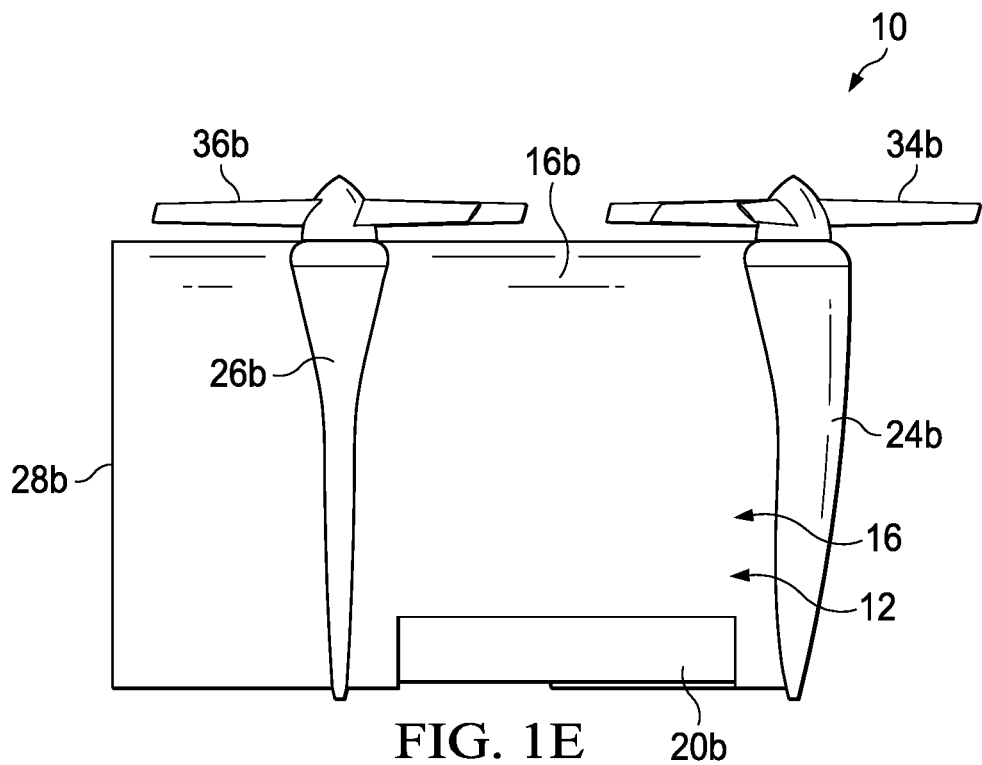

Referring to FIGS. 1A-1F in the drawings, various views of an aircraft 10 having a thrust-borne vertical lift mode in an M-wing configuration and a wing-borne forward flight mode in a gull wing configuration are depicted. FIGS. 1A, 1C, 1E depict aircraft 10 in thrust-borne vertical lift mode for vertical takeoffs, hovering and vertical landing, which may also be referred to as VTOL flight mode. FIGS. 1B, 1D, 1F depict aircraft 10 in wing-borne forward flight mode which may also be referred to as high speed, high efficiency and/or high endurance forward flight mode. In the illustrated embodiment, aircraft 10 has an airframe 12 including a fuselage 14 and a wing 16. Fuselage 14 may be coupled to wing 16 by any suitable means including being integral with wing 16. The outer skin of fuselage 14 and wing 16 is preferably formed from high strength and lightweight material such as fiberglass, carbon, plastic, metal or other suitable material or combination of materials.

Wing 16 has an airfoil cross-section that is operable to generate lift responsive to the forward airspeed of aircraft 10. Wing 16 has two outboard sections 16a, 16b with a dihedral root section 16c positioned therebetween. Dihedral root section 16c has a generally V-shaped cross section, as best seen in FIG. 1D. Outboard section 16a, which may be referred as the starboard outboard section, is coupled to an outboard end of dihedral root section 16c and is operable to pivot relative thereto about pivot axis 18a. Outboard section 16b, which may be referred as the port outboard section, is coupled to the other outboard end of dihedral root section 16c and is operable to pivot relative thereto about pivot axis 18b. Outboard section 16a includes control surfaces depicted as aerosurfaces 20a and outboard section 16b includes control surfaces depicted as aerosurfaces 20b. Aerosurfaces 20a, 20b preferably each have a split flap design. As best seen in FIG. 1F, aerosurfaces 20b include an upper flap 22a and a lower flap 22b that are operable for independent movement relative to one another and relative to wing 16. In wing-borne forward flight mode, aerosurfaces 20a, 20b may operate as traditional flaps to increase the lift provided by wing 16 at a given airspeed and/or increase the drag force. Aerosurfaces 20a, 20b may also operate as elevators to control the pitch and/or angle of attack of wing 16. In addition, aerosurfaces 20a, 20b may operate as ailerons to control the roll or bank of aircraft 10. Further, aerosurfaces 20a, 20b may be used to enhance hover stability in thrust-borne vertical lift mode.

Airframe 12 includes an inboard nacelle 24a that is positioned between outboard section 16a and dihedral root section 16c. Inboard nacelle 24a may be coupled to one or both of outboard section 16a and dihedral root section 16c by any suitable means including being integral with one of outboard section 16a or dihedral root section 16c. For example, inboard nacelle 24a may be fixed relative to outboard section 16a and may pivot relative to dihedral root section 16c with outboard section 16a. Alternatively, inboard nacelle 24a may be fixed relative to dihedral root section 16c such that outboard section 16a may pivot relative to nacelle 24a and dihedral root section 16c. Likewise, airframe 12 includes an inboard nacelle 24b that is positioned between outboard section 16b and dihedral root section 16c. Inboard nacelle 24b may be coupled to one or both of outboard section 16b and dihedral root section 16c by any suitable means including being integral with one of outboard section 16b or dihedral root section 16c. For example, inboard nacelle 24b may be fixed relative to outboard section 16b and may pivot relative to dihedral root section 16c with outboard section 16b. Alternatively, inboard nacelle 24b may be fixed relative to dihedral root section 16c such that outboard section 16b may pivot relative to nacelle 24b and dihedral root section 16c.

In the illustrated embodiment, airframe 12 includes an outboard nacelle 26a that is positioned mid span of outboard section 16a, at any suitable location between the coupling with dihedral root section 16c and wingtip 28a. Outboard nacelle 26a may be coupled to outboard section 16a by any suitable means including being integral with outboard section 16a. Likewise, airframe 12 includes an outboard nacelle 26b that is positioned mid span of outboard section 16b, at any suitable location between the coupling with dihedral root section 16c and wingtip 28b. Outboard nacelle 26b may be coupled to outboard section 16b by any suitable means including being integral with outboard section 16b. In other embodiments, outboard nacelles 26a, 26b could be located at the outboard ends of outboard section 16a, 16b, respectively.

Fuselage 14, wing 16 and nacelles 24a, 24b, 26a, 26b preferably include one or more internal regions and/or passageways operable to contain mechanical equipment, flight control systems, energy sources, communication lines, electrical lines and other desired systems. For example, in the illustrated embodiment, fuselage 14 contains a power system 30 for aircraft 10, as best seen in FIG. 1D. As discussed herein, power system 30 may include one or more internal combustion engines that are preferably used in mechanically driven embodiments of aircraft 10. Alternatively, power system 30 may include one or more electrical power sources such as batteries that are preferably used in electrically driven embodiments of aircraft 10. As another alternatively, power system 30 may be a hybrid power system including one or more internal combustion engines that drive alternators to charge one or more batteries that are used in electrically driven embodiments of aircraft 10.

As another example, as best seen in FIG. 1D, dihedral root section 16c houses the flight control system 32 of aircraft 10 such as a redundant digital flight control system or a triply redundant digital flight control system. Flight control system 32 preferably includes non-transitory computer readable storage media including a set of computer instructions executable by one or more processors for controlling the operation of aircraft 10. Flight control system 32 may be implemented on one or more general-purpose computers, special purpose computers or other machines with memory and processing capability. For example, flight control system 32 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 32 may be a microprocessor-based system operable to execute program code in the form of machine-executable instructions. In addition, flight control system 32 may be selectively connectable to other computer systems via a proprietary encrypted network, a public encrypted network, the Internet or other suitable communication network that may include both wired and wireless connections.

In the illustrated embodiment, aircraft 10 has a distributed thrust array that includes four propulsion assemblies that are independently operated and controlled by flight control system 32. More specifically, inboard propulsion assembly 34a extends from inboard nacelle 24a, inboard propulsion assembly 34b extends from inboard nacelle 24b, outboard propulsion assembly 36a extends from outboard nacelle 26a and outboard propulsion assembly 36b extends from outboard nacelle 26b. In the illustrated embodiment, the four independently operating propulsion assemblies 34a, 34b, 36a, 36b form a two-dimensional thrust array in the thrust-borne vertical lift mode of aircraft 10, as best seen in FIG. 1A, wherein propulsion assemblies 34a, 34b, 36a, 36b rotate in a common horizontal plane but do not occupy a common vertical plane. Also, in the illustrated embodiment, the four independently operating propulsion assemblies 34a, 34b, 36a, 36b form a one-dimensional thrust array in the wing-borne forward flight mode of aircraft 10, as best seen in FIG. 1D, wherein propulsion assemblies 34a, 34b, 36a, 36b rotate in a common vertical plane and also share a common horizontal plane. Flight control system 32 is operable to communicate with each propulsion assembly 34a, 34b, 36a, 36b such that each propulsion assembly 34a, 34b, 36a, 36b may be individually and independently controlled and operated. For example, flight control system 32 is operable to individually and independently control the operating speed and/or blade pitch of each propulsion assembly 34a, 34b, 36a, 36b.

Even though the distributed thrust array of the present disclosure has been depicted and described as having a particular number of propulsion assemblies, it should be understood by those having ordinary skill in the art that the distributed thrust array of the present disclosure could have any number of propulsion assemblies including six, eight or other number of independent propulsion assemblies. In addition, even though the propulsion assemblies of the present disclosure have been depicted and described as being mid wing propulsion assemblies, it should be understood by those having ordinary skill in the art that the propulsion assemblies of the present disclosure could have other configurations including high wing configurations, low wing configurations or other suitable configurations. Also, even though the propulsion assemblies of the present disclosure have been depicted and described as having three rotor blades, it should be understood by those having ordinary skill in the art that the propulsion assemblies of the present disclosure could have other numbers of rotor blades both less than and greater than three.

Referring specifically to FIGS. 1A, 1C and 1E, aircraft 10 is in the thrust-borne vertical lift mode and in the M-wing configuration. As discussed herein, each propulsion assembly 34a, 34b, 36a, 36b is independently controllable such that operational changes of certain propulsion assemblies 34a, 34b, 36a, 36b within the two-dimensional distributed thrust array enable pitch, yaw and roll control of aircraft 10 during such VTOL operations. For example, by using differential thrust output of propulsion assemblies 36a, 36b relative to propulsion assemblies 34a, 34b, pitch control is achieved. As another example, by using differential thrust output of propulsion assemblies 36a, 34a relative to propulsion assemblies 36b, 34b, roll control is achieved. Changing the thrust output of individual propulsion assemblies 34a, 34b, 36a, 36b may be accomplished by changing the rotational speed of particular propulsion assemblies 34a, 34b, 36a, 36b in embodiments wherein propulsion assemblies 34a, 34b, 36a, 36b have fixed pitch or variable pitch rotors. Additionally, changing the thrust output of individual propulsion assemblies 34a, 34b, 36a, 36b may be accomplished by changing the blade pitch of particular propulsion assemblies 34a, 34b, 36a, 36b in embodiments of propulsion assemblies 34a, 34b, 36a, 36b that incorporate variable pitch rotors and collective pitch control.

Torque balance of aircraft 10 during VTOL operations may be achieved by counter rotating propulsion assemblies 34a, 34b and counter rotating propulsion assemblies 36a, 36b. Alternatively or additionally, torque balance of aircraft 10 during VTOL operations may be achieved by counter rotating propulsion assemblies 34a, 36a and counter rotating propulsion assemblies 34b, 36b. Yaw control and/or correction of torque imbalances of aircraft 10 may be achieved by utilizing differential thrust output of clockwise rotating propulsion assemblies 36a, 34b compared to counter clockwise rotating propulsion assemblies 36b, 34a. In a similar manner, yaw control of aircraft 10 may be achieved by utilizing differential thrust output of port propulsion assemblies 34b, 36b compared to starboard propulsion assemblies 34a, 36a in the wing-borne forward flight mode of aircraft 10, as best seen in FIGS. 1B, 1D, 1F. In the illustrated embodiment, it should be noted that the V-shaped form of dihedral root section 16c offers sufficient aerodynamic surface to provide yaw stability without the requirement for a conventional or deployable vertical tail or empennage. In other embodiments, a vertical tail or empennage could be added.

Figure 1G:
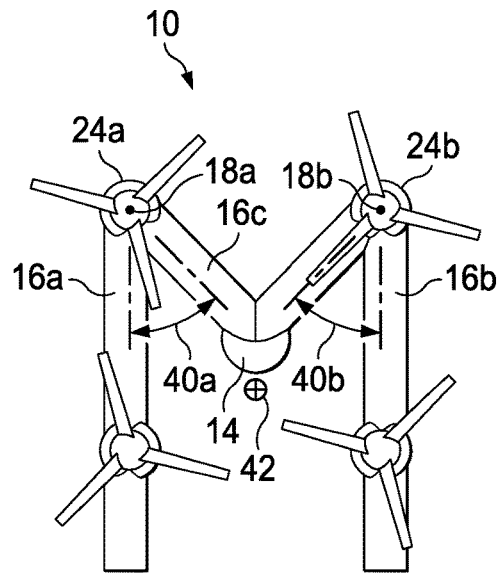

The M-wing configuration of aircraft 10, the gull wing configuration of aircraft 10 and transitions therebetween will now be described with reference to FIGS. 1G-1J. In thrust-borne vertical lift mode, aircraft 10 is preferably arranged in the M-wing configuration, as best seen in FIG. 1G. In the M-wing configuration, outboard section 16a of wing 16 is folded relative to dihedral root section 16c such that the minor angle 40a between outboard section 16a and dihedral root section 16c forms an acute angle. Likewise, outboard section 16b of wing 16 is folded relative to dihedral root section 16c such that the minor angle 40b between outboard section 16b and dihedral root section 16c forms an acute angle. In the illustrated embodiment, minor angle 40a and minor angle 40b are congruent angles and are about 45 degrees such that outboard sections 16a, 16b are generally parallel to each other. In the M-wing configuration, the center of gravity 42 of aircraft 10 is located between outboard sections 16a, 16b and is substantially centered between propulsion assemblies 34a, 34b, 36a, 36b which aids in stability of aircraft 10 during VTOL operations.

Figure 1H:
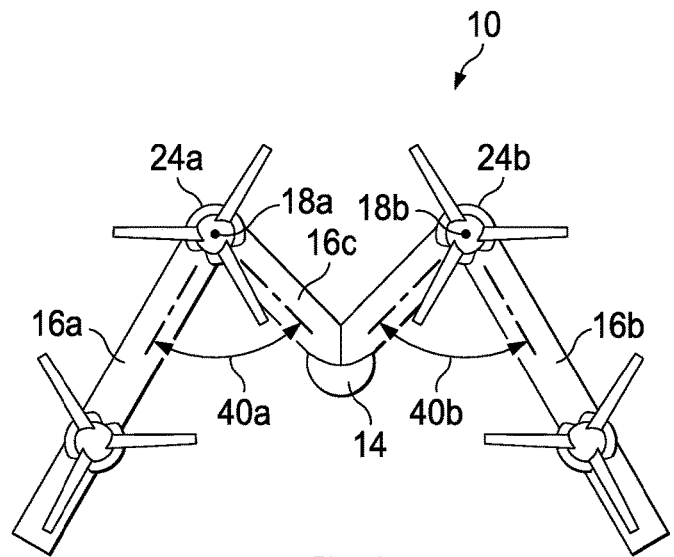
Figure 1I:
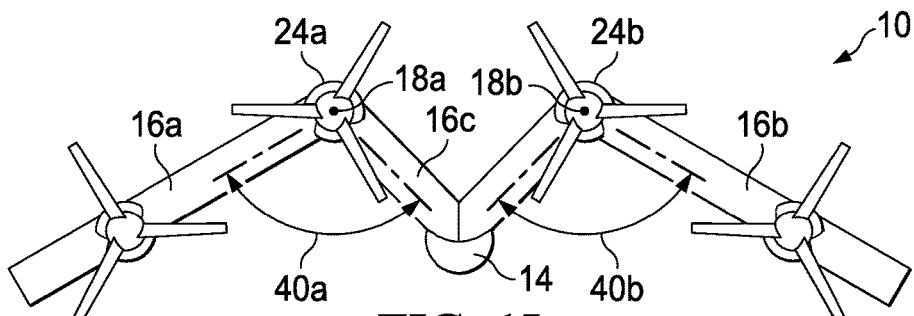
Figure 1J:
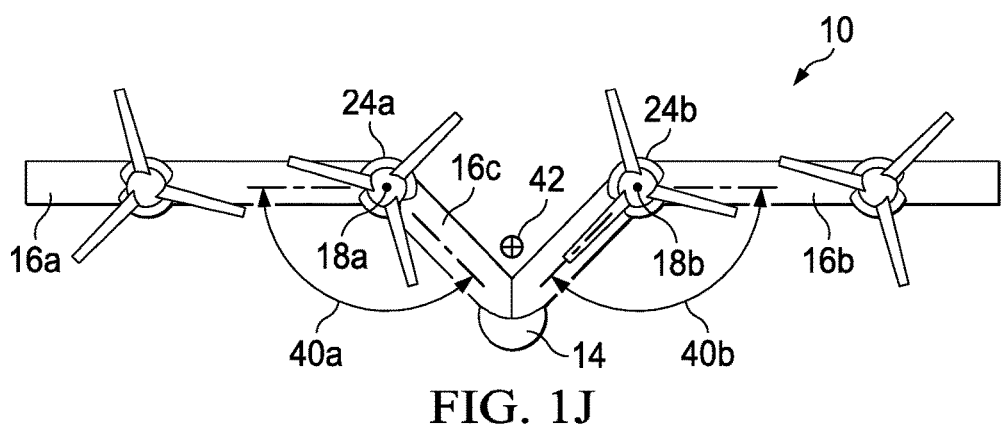

In wing-borne forward flight mode, aircraft 10 is preferably arranged in the gull wing configuration, as best seen in FIG. 1J. In the gull wing configuration, outboard section 16a of wing 16 is extended relative to dihedral root section 16c such that minor angle 40a between outboard section 16a and dihedral root section 16c forms an obtuse angle. Likewise, outboard section 16b of wing 16 is extended relative to dihedral root section 16c such that minor angle 40b between outboard section 16b and dihedral root section 16c forms an obtuse angle. In the illustrated embodiment, minor angle 40a and minor angle 40b are congruent angles and are about 135 degrees such that outboard sections 16a, 16b occupy the same plane. In the gull wing configuration, the center of gravity 42 of aircraft 10 is located below outboard sections 16a, 16b of wing 16, which aids in stability of aircraft 10 during forward flight operations.

As discussed herein, aircraft 10 preferably transitions between the M-wing configuration and the gull wing configuration as aircraft 10 transitions between thrust-borne vertical lift mode and wing-borne forward flight mode. The transition from the M-wing configuration to the gull wing configuration is represented sequentially in FIGS. 1G-1J. As illustrated, outboard section 16a is operable to pivot from the folded position to the extended position relative to dihedral root section 16c about pivot axis 18a (see also FIG. 1B) that is collocated with the center of inboard nacelle 24a. Likewise, outboard section 16b is operable to pivot from the folded position to the extended position relative to dihedral root section 16c about pivot axis 18b (see also FIG. 1B) that is collocated with the center of inboard nacelle 24b. Preferably, outboard section 16a and outboard section 16b are pivoted simultaneously which aids in stability of aircraft 10 during transitions from thrust-borne vertical lift mode to wing-borne forward flight mode. For example, FIG. 1H illustrates aircraft 10 in one state during the transition from the M-wing configuration to the gull wing configuration wherein minor angle 40a and minor angle 40b are congruent angles and are about 75 degrees. As another example, FIG. 1I illustrates aircraft 10 in another state during the transition from the M-wing configuration to the gull wing configuration wherein minor angle 40a and minor angle 40b are congruent angles and are about 105 degrees.

The transition from the gull wing configuration to the M-wing configuration is represented sequentially in FIGS. 1J-1G. As illustrated, outboard section 16a is operable to pivot from the extended position to the folded position relative to dihedral root section 16c about pivot axis 18a. Likewise, outboard section 16b is operable to pivot from the extended position to the folded position relative to dihedral root section 16c about pivot axis 18b. Preferably, outboard section 16a and outboard section 16b are pivoted simultaneously which aids in stability of aircraft 10 during transitions from wing-borne forward flight mode to thrust-borne vertical lift mode. For example, FIG. 1I illustrates aircraft 10 in one state during the transition from the gull wing configuration to the M-wing configuration wherein minor angle 40a and minor angle 40b are congruent angles and are about 105 degrees. As another example, FIG. 1H illustrates aircraft 10 in another state during the transition from the gull wing configuration to the M-wing configuration wherein minor angle 40a and minor angle 40b are congruent angles and are about 75 degrees.

Figure 2A:
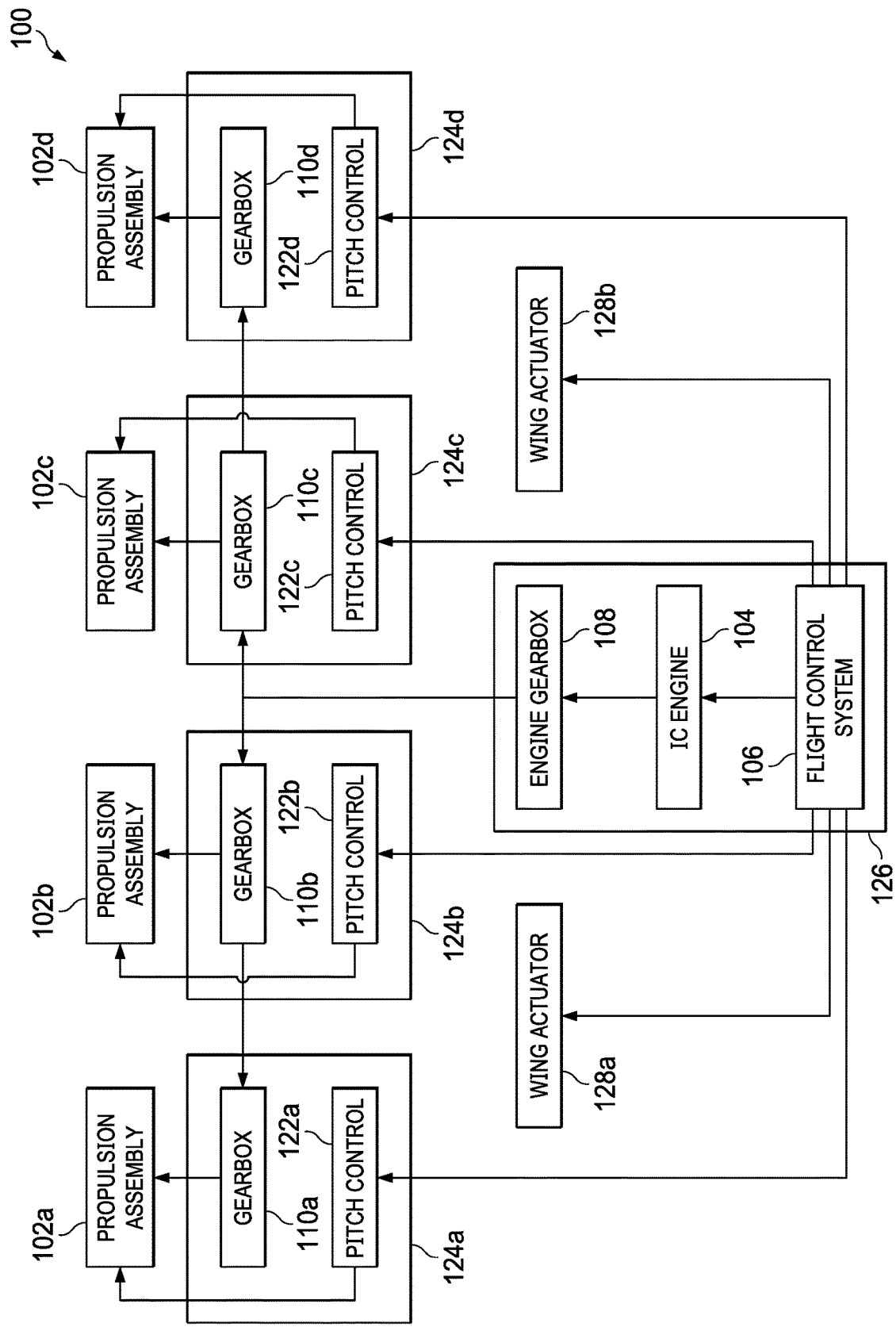
FIG. 2A is a block diagram depicting power, thrust and control systems for an aircraft having M-wing and gull wing configurations in accordance with embodiments of the present disclosure.

Referring additionally to FIG. 2A, a block diagram depicts power, thrust and control systems of an aircraft 100 having M-wing and gull wing configurations. Aircraft 100 includes propulsion assemblies 102a, 102b, 102c, 102d, a power system depicted as an internal combustion engine 104, such as a turboshaft engine operable to burn a liquid fluid, and a flight control system 106. Engine 104 is coupled to each of propulsion assemblies 102a, 102b, 102c, 102d by a drive system depicted as engine gearbox 108, outboard gearbox 110a, inboard gearbox 110b, inboard gearbox 110c and outboard gearbox 110d. An embodiment of the drive system is depicted in FIG. 2B. An output shaft 112 of engine 104 drives engine gearbox 108 that contains a beveled gear set 114 operable to change the direction of torque by ninety degrees. Beveled gear set 114 may include straight bevel gears, spiral bevel gears or other suitable gear arrangements. In the illustrated embodiment, beveled gear set 114 includes one input gear coupled to shaft 112 and two output gears coupled to shafts 116b, 116c that respectively provide torque paths to inboard gearbox 110b and inboard gearbox 110c.

Inboard gearbox 110b contains a beveled gear set 118b operable to change the direction of torque by ninety degrees to drive propulsion assembly 102b and to change the direction of torque by an additional ninety degrees to drive outboard gearbox 110a. Beveled gear set 118b may include straight bevel gears, spiral bevel gears or other suitable gear arrangements. In the illustrated embodiment, beveled gear set 118b includes one input gear coupled to shaft 116b and two output gears coupled to shafts 120b, 116a that respectively provide torque paths to propulsion assembly 102b and outboard gearbox 110a. Inboard gearbox 110c contains a beveled gear set 118c operable to change the direction of torque by ninety degrees to drive propulsion assembly 102c and to change the direction of torque by an additional ninety degrees to drive outboard gearbox 110d. Beveled gear set 118c may include straight bevel gears, spiral bevel gears or other suitable gear arrangements. In the illustrated embodiment, beveled gear set 118c includes one input gear coupled to shaft 116c and two output gears coupled to shafts 120c, 116d that respectively provide torque paths to propulsion assembly 102c and outboard gearbox 110d.

Outboard gearbox 110a contains a beveled gear set 118a operable to change the direction of torque by ninety degrees to drive propulsion assembly 102a. Beveled gear set 118a may include straight bevel gears, spiral bevel gears or other suitable gear arrangements. In the illustrated embodiment, beveled gear set 118a includes one input gear coupled to shaft 116a and one output gear coupled to shaft 120a that provides a torque path to propulsion assembly 102a. Outboard gearbox 110d contains a beveled gear set 118d operable to change the direction of torque by ninety degrees to drive propulsion assembly 102d. Beveled gear set 118d may include straight bevel gears, spiral bevel gears or other suitable gear arrangements. In the illustrated embodiment, beveled gear set 118d includes one input gear coupled to shaft 116d and one output gear coupled to shaft 120d that provides a torque path to propulsion assembly 102d. While not illustrated, engine gearbox 108 and/or outboard gearbox 110a, inboard gearbox 110b, inboard gearbox 110c and outboard gearbox 110d may include additional gear systems such as gear-reducing transmissions designed to enable optimum engine speed and optimal rotor speed during flight operations.

Referring again to FIG. 2A, internal combustion engine 104 preferably operates at a constant speed during flight operations. In order to individually control the thrust output from each of propulsion assemblies 102a, 102b, 102c, 102d, flight control system 106 sends commands to pitch control assemblies 122a, 122b, 122c, 122d to adjust the pitch of the associated rotor blades. In an embodiment, pitch control assemblies 122a, 122b, 122c, 122d may include rise and fall swash plates operable for collective pitch control and/or cyclic pitch control. In the illustrated embodiment, outboard gearbox 110a and pitch control assembly 122a are housed within outboard nacelle 124a; inboard gearbox 110b and pitch control assembly 122b are housed within inboard nacelle 124b; inboard gearbox 110c and pitch control assembly 122c are housed within inboard nacelle 124c; and outboard gearbox 110d and pitch control assembly 122d are housed within outboard nacelle 124d. Also, in the illustrated embodiment, engine 104, flight control system 106 and engine gearbox 108 are housed within fuselage 126.

In order to transition aircraft 100 between the gull wing configuration and the M-wing configuration, aircraft 100 includes port wing actuator 128a and starboard wing actuator 128b. Wing actuators 128a, 128b may be housed within the outboard sections of the wing, within the dihedral root section of the wing and/or within inboard nacelles 124b, 124c. As best seen in FIG. 2B, port wing actuator 128a is configured to pivot the port outboard section of the wing relative to the dihedral root section of the wing about pivot axis 130a. Likewise, starboard wing actuator 128b is configured to pivot the starboard outboard section of the wing relative to the dihedral root section of the wing about pivot axis 130b. In an embodiment, as best seen in FIG. 2C, wing actuator 128a may be an electrically driven actuator that include, for example, a stepper motor 132 in series with a double helix worm gear 134, a wheel gear 136, a double helix worm gear 138 and a wheel gear 140. Wheel gear 140 preferably rotates about pivot axis 130a such that when the output of wheel gear 140 is coupled to the port outboard section of the wing, operation of port wing actuator 128a causes the port outboard section to transition between folded and extended positions. Starboard wing actuator 128b may operate in a similar manner to cause the starboard outboard section to transition between folded and extended positions.

Electrical power to wing actuators 128a, 128b may be provided by one or more batteries (not pictured) that may be charged from the output of an alternator (not pictured) coupled to engine 104 or other suitable electric source. Wing actuators 128a, 128b have a suitable gear reduction such as between about 100 to 1 and about 200 to 1. Wing actuators 128a, 128b are preferably self-locking in both in the gull wing configuration and the M-wing configuration of aircraft 100. In other embodiments, wing actuators 128a, 128b may be hydraulic linear actuators that use hydraulic force to transition the wing between folded and extended positions and to lock the wing in the desired position. In further embodiments, wing actuators 128a, 128b may be mechanical linear actuators and may include mechanical locks to maintain the wing in the desired position.

As discussed herein, during transitions between the gull wing configuration and the M-wing configuration of aircraft 100, the outboard sections of the wing pivot between the extended position (see FIG. 1J) and the folded position (see FIG. 1G) relative to the dihedral root section. To maintain a constant torque path to each of propulsion assemblies 102a, 102b, 102c, 102d, inboard gearboxes 110b, 110c must accommodate this direction change. This accommodation is illustrated in FIGS. 2D-2E depicting beveled gear set 118c of inboard gearbox 110c in two operating positions. In FIG. 2D, which is the gull wing configuration of aircraft 100, the minor angle between input shaft 116c and output shaft 116d is about 135 degrees, which is congruent with the minor angle between the outboard sections of the wing and the dihedral root section of the wing (see FIG. 1J). In FIG. 2E, which is the M-wing configuration of aircraft 100, the minor angle between input shaft 116c and output shaft 116d is about 45 degrees, which is congruent with the minor angle between the outboard sections of the wing and the dihedral root section of the wing (see FIG. 1G). During the transitions between the gull wing configuration and the M-wing configuration, the gear of output shaft 116d precesses about the gear of output shaft 120c while maintaining the torque path therebetween.

Figure 3:
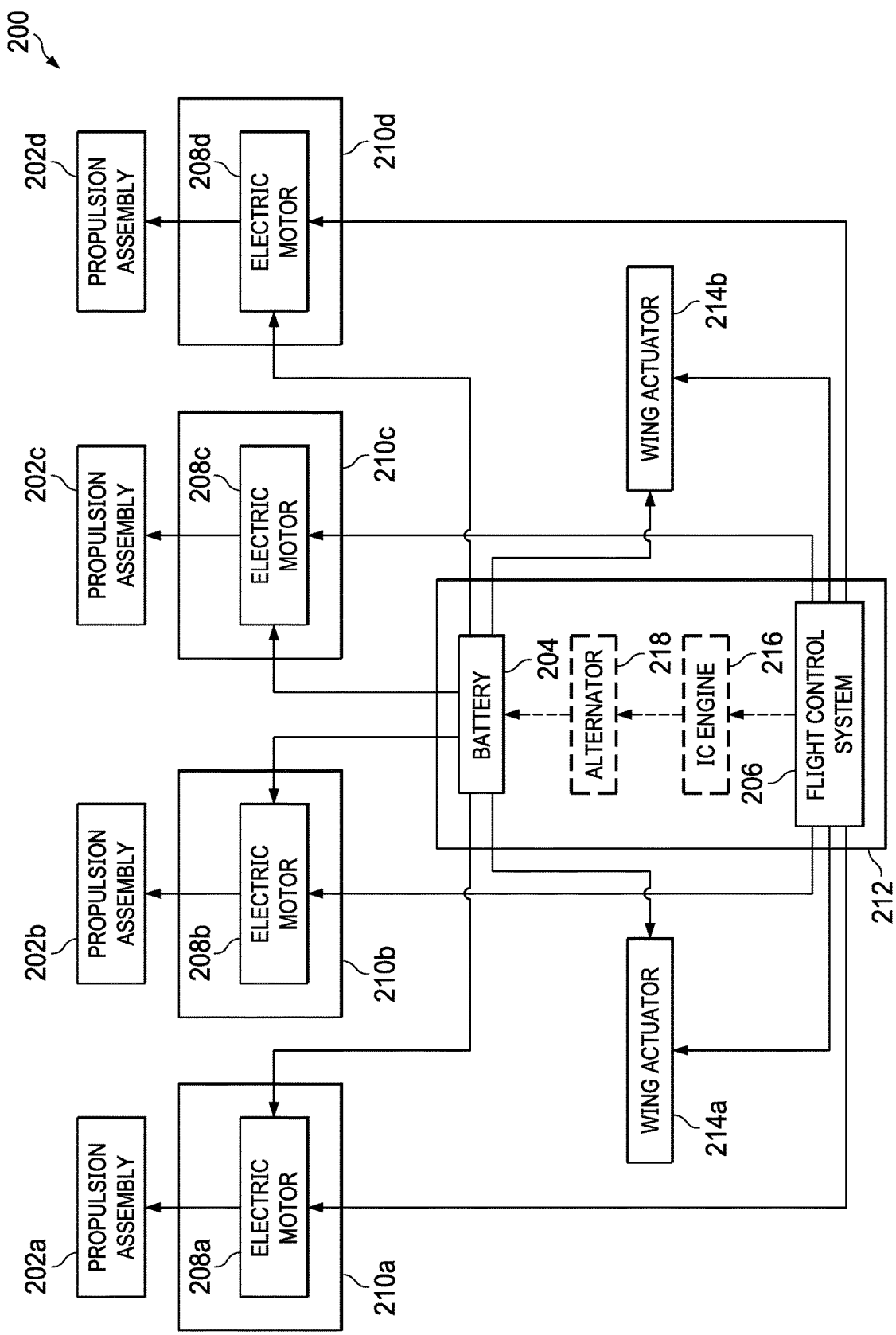
FIG. 3 is a block diagram depicting power, thrust and control systems for an aircraft having M-wing and gull wing configurations in accordance with embodiments of the present disclosure.

Referring now to FIG. 3, a block diagram depicts power, thrust and control systems of an aircraft 200 having M-wing and gull wing configurations. Aircraft 200 includes propulsion assemblies 202a, 202b, 202c, 202d, a power system depicted as one or more batteries 204 and a flight control system 206. In the illustrated embodiment, each propulsion assembly 202a, 202b, 202c, 202d is driven by a respective electric motor 208a, 208b, 208c, 208d that receives power from battery 204. In order to individually control the thrust output from each of propulsion assemblies 202a, 202b, 202c, 202d, flight control system 206 sends commands to electric motors 208a, 208b, 208c, 208d to adjust the rotational speed of the associated rotor blades. In the illustrated embodiment, electric motor 208a is housed within outboard nacelle 210a; electric motor 208b is housed within inboard nacelle 210b; electric motor 208c is housed within inboard nacelle 210c; and electric motor 208da is housed within outboard nacelle 210d. Also, in the illustrated embodiment, battery 204 and flight control system 206 are housed within fuselage 212. Optionally, the power system of aircraft 200 could be a hybrid power system in which an internal combustion engine 216 drives an alternator 218 to charge battery 204 during flight. Even though aircraft 200 has been depicted and described as having a one to one relationship of electric motors to propulsion assemblies, it should be understood by those having ordinary skill in the art that an aircraft of the present disclosure could have a single electric motor driving more than one propulsion assembly or could have more than one electric motor driving a single propulsion assembly.

In order to transition aircraft 200 between the gull wing configuration and the M-wing configuration, aircraft 200 includes port wing actuator 214a and starboard wing actuator 214b. Wing actuators 214a, 214b may be housed within the outboard sections of the wing, within the dihedral root section of the wing and/or within inboard nacelles 210b, 210c. As discussed herein, port wing actuator 214a is configured to pivot the port outboard section of the wing relative to the dihedral root section of the wing about a pivot axis collocated with inboard nacelle 210b. Likewise, starboard wing actuator 214b is configured to pivot the starboard outboard section of the wing relative to the dihedral root section of the wing about a pivot axis collocated with inboard nacelle 210c. Also, as discussed herein, wing actuators 214a, 214b are electrically driven actuators that may include a stepper motor in series with a first double helix worm gear, a first wheel gear, a second double helix worm gear and a second wheel gear (see FIG. 2B).

Figure 4A:
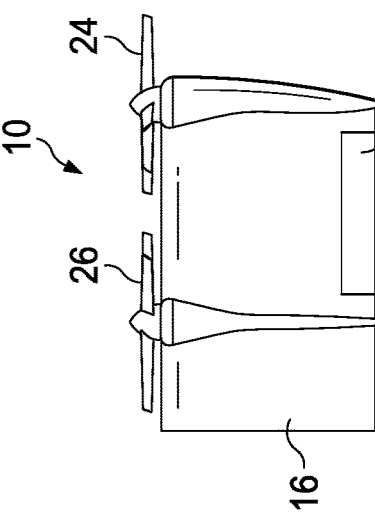
FIGS. 4A-4J are schematic illustrations of an aircraft having M-wing and gull wing configurations in a sequential flight operating scenario in accordance with embodiments of the present disclosure.

Referring next to FIGS. 4A-4J in the drawings, a sequential flight-operating scenario of aircraft 10 is depicted. It is noted that reference to the port and starboard components of aircraft 10 will be made collectively in FIGS. 4A-4J. For example, a reference to propulsion assemblies 24 in FIGS. 4A-4J is equivalent to the reference to propulsion assemblies 24a, 24b in FIGS. 1A-1J. As best seen in FIG. 4A, aircraft 10 is positioned on a launch surface at a current location. Aircraft 10 is in the M-wing configuration with the rotor blades of propulsion assemblies 24, 26 positioned to rotate in a substantially horizontal plane. Aircraft 10 may be operated responsive to autonomous flight control, remote flight control or a combination thereof. For example, it may be desirable to utilize remote flight control during certain maneuvers such as takeoff and landing but rely on autonomous flight control during hover, forward flight and/or transitions between forward flight and VTOL operations.

Figure 4B:
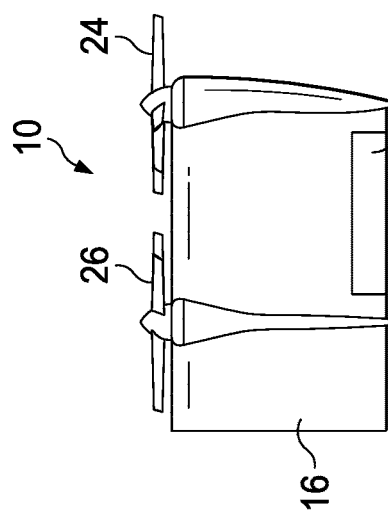
Figure 4C:
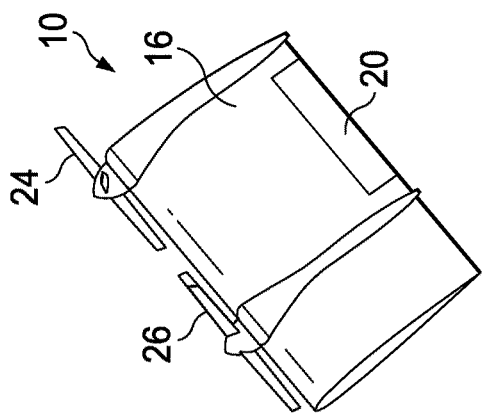
Figure 4D:
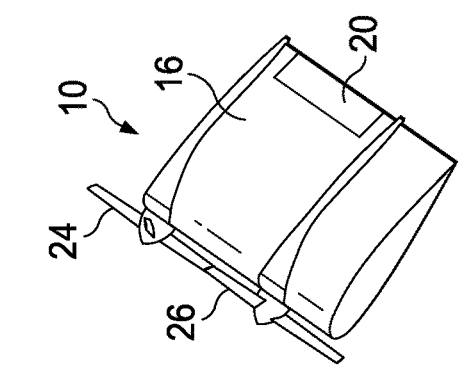
Figure 4E:
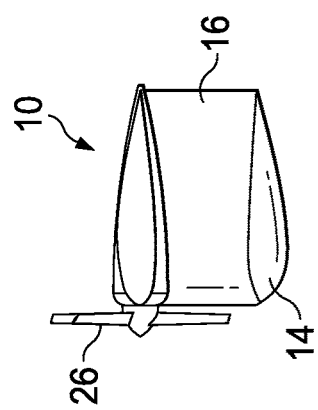

Regardless of the chosen flight control mode, each of propulsion assemblies 24, 26 may be independently controllable during VTOL flight operations to provide pitch, roll and yaw control through differential thrust output from propulsion assemblies 24, 26, as described herein. After takeoff, aircraft 10 may begin the transition from thrust-borne vertical lift mode to wing-borne forward flight mode, as best seen in the progression of FIGS. 4B-4E. In the illustrated embodiment, the transition begins with aircraft 10 traveling generally vertically to a desired altitude and to a desired speed, as best seen in FIG. 4B. Aircraft 10 may then begin to pitch forward by, for example, engaging in differential thrust output of propulsion assemblies 24 relative to propulsion assemblies 26. At the same time, wing 16 may begin to unfold to expand the wing surface available for lift, as best seen in FIGS. 4C and 1H. The process of pitching forward and unfolding wing 16 continues, as best seen in FIGS. 4D and 1I. The transition is complete when wing 16 is fully extended and aircraft 10 has pitched forward to a horizontal attitude, as best seen in FIGS. 4E and 1J. In other embodiments, the processes of pitching aircraft 10 forward and extending wing 16 may occur independent of each other with the forward pitching taking place before the wing extension or the wing extension taking place before the forward pitching.

Figure 5C:
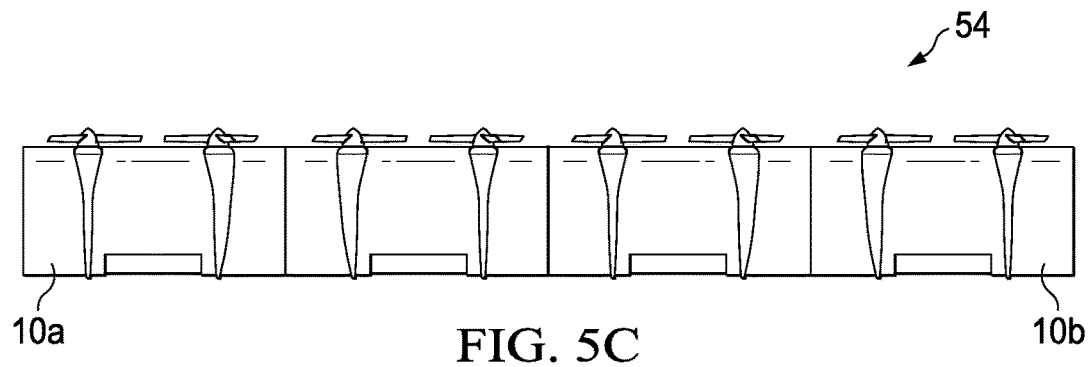
FIGS. 5A-5C are schematic illustrations of an aircraft having M-wing and gull wing configurations in a detect and connect operating scenario in accordance with embodiments of the present disclosure.
Figure 5B:
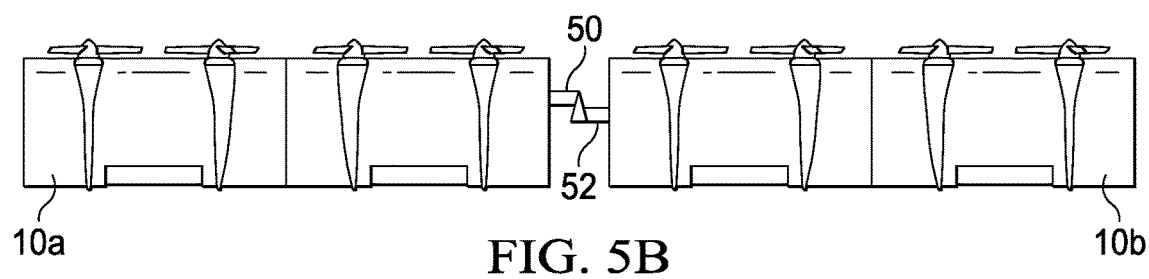
Figure 5A:
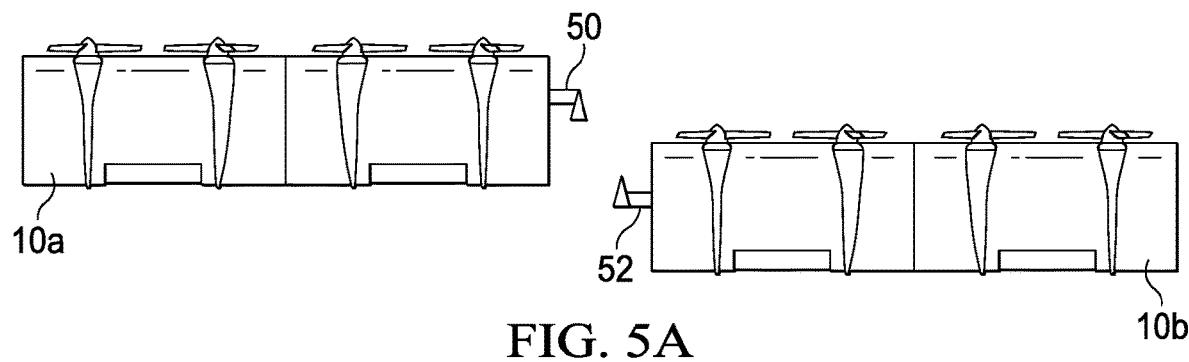

Once aircraft 10 has completed the transition to wing-borne forward flight mode, aircraft 10 may engage in high speed, high efficiency and/or high endurance forward flight. In one example, one or more of the propulsion assemblies of aircraft 10 may be operated in a low power mode or shut off entirely to maximize efficiency and/or match the thrust to drag. In another example, as best seen in FIGS. 5A-5C, multiple aircraft 10a, 10b may be coupled together wingtip-to-wingtip to improve propulsive and aerodynamic efficiency as well as to provide added mission functionality. In the illustrated embodiment, aircraft 10a, 10b are engaging in an air-to-air coupling procedure such as a detect and connect coupling procedure. In FIG. 5A, aircraft 10a has deployed a female wingtip coupling assembly depicted as receiver 50 and aircraft 10b has deployed a male wingtip coupling assembly depicted as lance 52. Responsive to autonomous flight control, remote flight control or a combination thereof, aircraft 10a, 10b engage in a docking maneuver to insert lance 52 within receiver 50, as best seen in FIG. 5B. Thereafter, aircraft 10a and/or aircraft 10b may retract receiver 50 and lance 52 to bring aircraft 10a, 10b into wingtip-to-wingtip coupling, as best seen in FIG. 5C. One or more additional securing or locking devices (not pictured) may be used to further secure aircraft 10a, 10b together for tandem flight of the multi-aircraft system 54. This procedure can be repeated with additional aircraft 10 to form larger multi-aircraft systems including three, four or other suitable number of aircraft.

After forming the desired multi-aircraft system, one or more of the propulsion assemblies of one or both of aircraft 10a, 10b may be operated in a low power mode or shut off entirely to reduce power consumption and extend the range of multi-aircraft system 54. In addition, aircraft 10a, 10b may share power, communications, fuel or other resources via suitable interfaces between aircraft 10a, 10b. In one example, the wingtips of aircraft 10a, 10b may have contact pads operable to transmit electrical power between aircraft 10a, 10b. As another example, data may be sent via a wired or wireless interface between aircraft 10a, 10b. When it is desired to reengage individual flight, aircraft 10a deploys receiver 50 and aircraft 10b deploys lance 52, as best seen in FIG. 5B. Responsive to autonomous flight control, remote flight control or a combination thereof, aircraft 10a, 10b engage in a separation maneuver to detach lance 52 from receiver 50, as best seen in FIG. 5A. Thereafter, aircraft 10a, 10b are operable for independent flight.

Figure 4F:
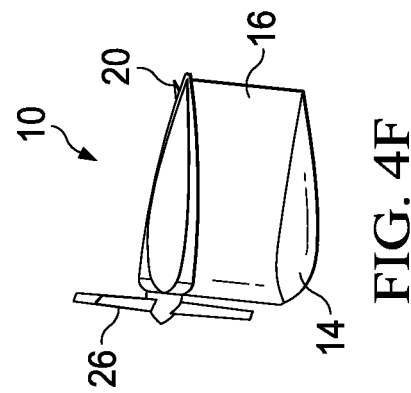
Figure 4G:
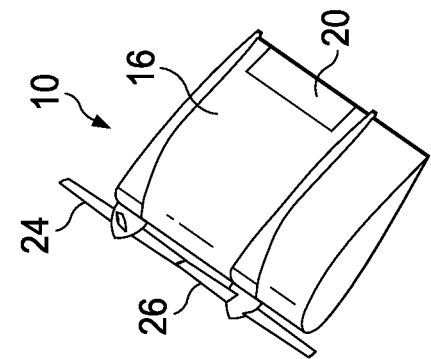
Figure 4H:
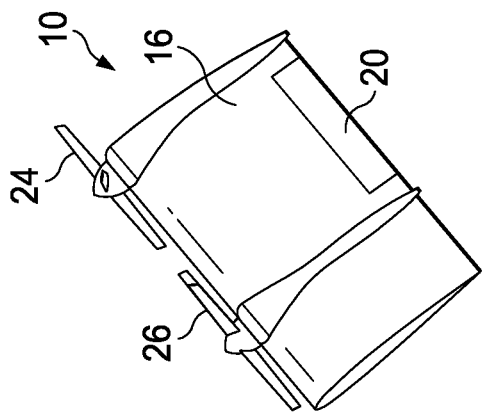
Figure 4I:
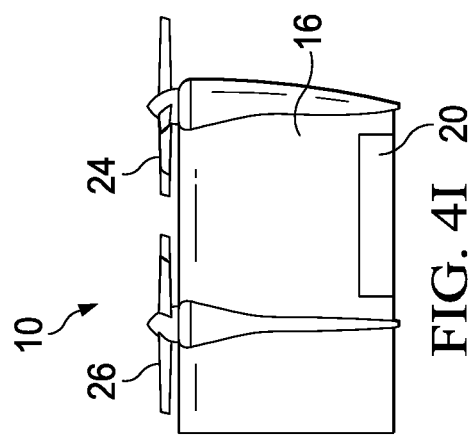
Figure 4J:
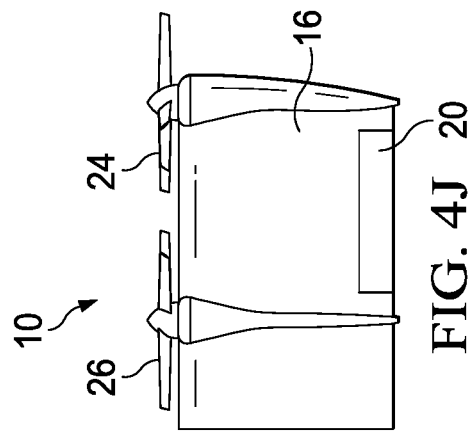

Returning to FIGS. 4A-4J, when aircraft 10 is approaching the destination, aircraft 10 may begin the transition from wing-borne forward flight mode to thrust-borne vertical lift mode, as best seen in the progression of FIGS. 4F-4I. In the illustrated embodiment, with aircraft 10 at a desired altitude and a desired speed, aerosurfaces 20 may be operated as elevators to increase the angle of attack of wing 16, as best seen in FIG. 4F. Aircraft 10 may then begin to pitch up by, for example, beginning to fold wing 16 and engaging in differential thrust output of propulsion assemblies 24 relative to propulsion assemblies 26, as best seen in FIGS. 4G and 1I. The process of pitching up and folding wing 16 continues, as best seen in FIGS. 4H and 1H. The transition is complete when wing 16 is fully folded, as best seen in FIG. 1G, and aircraft 10 has pitched up such that the rotor blades of propulsion assemblies 24, 26 are rotating in a substantially horizontal plane, as best seen in FIG. 4I. In other embodiments, the processes of pitching aircraft 10 up and folding wing 16 may occur independent of each other with the pitching up taking place before the wing folding or the wing folding taking place before the pitching up. Once aircraft 10 has completed the transition to thrust-borne vertical lift mode, aircraft 10 may commence its vertical descent to a landing surface at the destination location. As best seen in FIG. 4J, aircraft 10 has landed and is resting on the surface.

Figure 6:
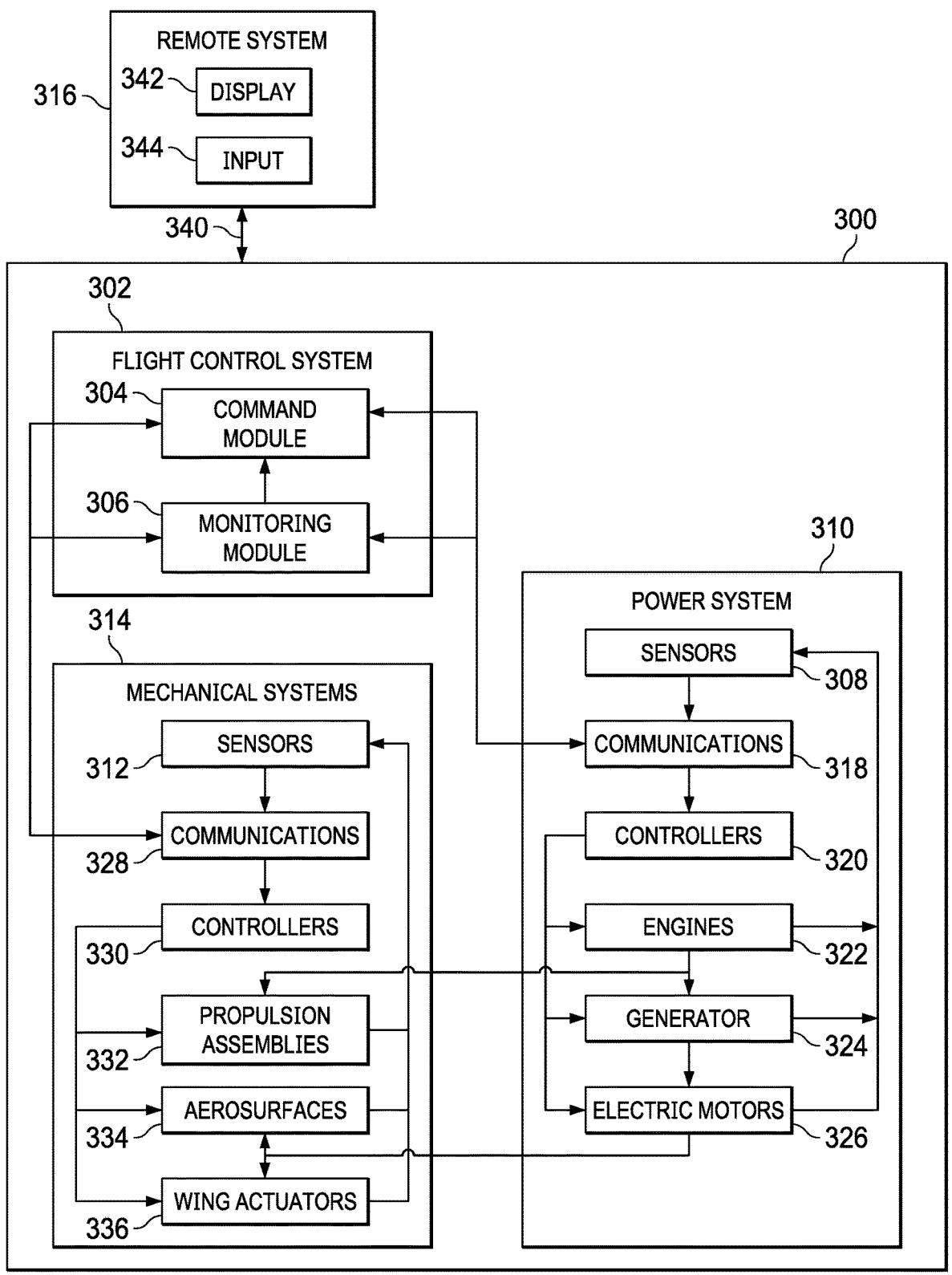
FIG. 6 is a systems diagram of an aircraft having M-wing and gull wing configurations in accordance with embodiments of the present disclosure.

Referring to FIG. 6 in the drawings, a systems diagram of an aircraft having M-wing and gull wing configurations is generally designated 300. As discussed herein, the aircraft of the present disclosure may be operated autonomously responsive to commands generated by a flight control system 302. In the illustrated embodiment, flight control system 302 includes a command module 304 and a monitoring module 306. It is to be understood by those having ordinary skill in the art that these and other modules executed by flight control system 302 may be implemented in a variety of forms including hardware, software, firmware, special purpose processors and combinations thereof. Flight control system 302 receives input from a variety of sources including sensors 308 of power system 310 and sensors 312 of mechanical system 314. Flight control system 302 may also receive input from external sources such as remote system 316, global positioning systems and the like. In the illustrated embodiment, power system 310 includes sensors 308, communications 318, controllers 320, engines 322, generator 324, electric motors 326 and other components required for power generation that are known to those skilled in the art. In addition, mechanical system 314 include sensors 312, communications 328, controllers 330, propulsion assemblies 332, aerosurfaces 334, wing actuators 336 and other components required for operating an aircraft that are known to those skilled in the art.

In one operational example, flight control system 302 may receive a mission from an external source, such as a command and control station, to deliver a payload to a desired location. Once the payload is secured to aircraft 300, flight control system 302 may autonomously control all aspects of flight of aircraft 300. During the various operating modes of aircraft 300 including the thrust-borne vertical lift mode, the wing-borne forward flight mode and transitions therebetween, to name a few, command module 304 provides commands to controllers 318 of power system 310 and controllers 330 of mechanical systems 314 to establish the desired operating parameters for each propulsion assembly, as discussed herein. For example, these commands may include rotor speed, rotor blade pitch, wing configuration, aerosurface position and the like. Flight control system 302 receives feedback from sensors 308 of power system 310 and sensors 312 of mechanical system 314. This feedback is processes by monitoring module 306, which supplies correction data and other information to command module 304. Monitoring module 306 preferably receives and processes information from additional aircraft sensors (not shown), such as positioning sensors, attitude sensors, speed sensors, environmental sensors, fuel sensors, temperature sensors, location sensors and the like. Monitoring module 306 provides the processed information to command module 304 to further enhance autonomous flight control capabilities.

Some or all of the autonomous control capability of flight control system 302 may be augmented or supplanted by remote flight control system 316. Remote system 316 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 316 communicates with flight control system 302 via a communication link 340 that may include both wired and wireless connections.

Remote system 316 preferably includes one or more display devices 342 configured to display information relating to one or more aircraft of the present disclosure. Display devices 342 may be configured in any suitable form, including, for example, liquid crystal displays, light emitting diode displays, cathode ray tube displays or any suitable type of display. Remote system 316 may also include audio output and input devices such as a microphone, speakers and/or an audio port allowing an operator to communicate with, for example, an operator of another remote system of the present disclosure. The display device 342 may also serve as an input device 344 if a touch screen display implementation is used, however, other input devices, such as a keyboard or joysticks, may alternatively be used to allow an operator to provide control commands to an aircraft being operated responsive to remote control.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft having a thrust-borne vertical lift mode and a wing-borne forward flight mode, the aircraft comprising:
   a fuselage;
   a wing coupled to the fuselage, the wing having a dihedral root section with first and second outboard ends, a first outboard section pivotable relative to the first outboard end of the dihedral root section and a second outboard section pivotable relative to the second outboard end of the dihedral root section;
   a thrust array including a first inboard propulsion assembly coupled between the first outboard end of the dihedral root section and the first outboard section of the wing forming a first pivot axis, a second inboard propulsion assembly coupled between the second outboard end of the dihedral root section and the second outboard section of the wing forming a second pivot axis, a first outboard propulsion assembly coupled to the first outboard section of the wing and a second outboard propulsion assembly coupled to the second outboard section of the wing;
   a power system including an engine and a drive system, the drive system including first and second bevel gear sets, the first bevel gear set including an input gear configured to receive torque from the engine, a first output gear rotatable about the first pivot axis and configured to provide torque to the first inboard propulsion assembly and a second output gear configured to provide torque to the first outboard propulsion assembly, the second bevel gear set including an input gear configured to receive torque from the engine, a first output gear rotatable about the second pivot axis and configured to provide torque to the second inboard propulsion assembly and a second output gear configured to provide torque to the second outboard propulsion assembly; and
   a flight control system operably associated with the thrust array and the wing, the flight control system operable to control thrust output from each of the propulsion assemblies and operable to control wing configuration;
   wherein, in the thrust-borne vertical lift mode, the wing has an M-wing configuration with the center of gravity of the aircraft located between the outboard sections of the wing;
   wherein, in the wing-borne forward flight mode, the wing has a gull wing configuration with the center of gravity of the aircraft located below the outboard sections of the wing; and
   wherein, during transitions between the M-wing configuration and the gull wing configuration, the second output gear precesses about the first output gear changing an angle between the input gear and the second output gear, for both the first and second bevel gear sets.

2. The aircraft as recited in claim 1 wherein the propulsion assemblies further comprise variable pitch rotor blades operable to change thrust output responsive to changes in rotor blade pitch.

3. The aircraft as recited in claim 1 wherein the propulsion assemblies further comprise fixed pitch rotor blades operable to change thrust output responsive to changes in rotational speed.

4. The aircraft as recited in claim 1 wherein the engine further comprises an internal combustion engine.

5. The aircraft as recited in claim 1 wherein the power system further comprises at least one alternator driven by the engine and at least one battery charged by the at least one alternator.

6. The aircraft as recited in claim 1 wherein, in the thrust-borne vertical lift mode, the flight control system is operable to control pitch, roll and yaw responsive to differential thrust output from the propulsion assemblies of the thrust array.

7. The aircraft as recited in claim 1 wherein, in the wing-borne forward flight mode, the flight control system is operable to control yaw responsive to differential thrust output from the propulsion assemblies of the thrust array and wherein the dihedral root section has a V-shape that adds aerodynamic surface to improve yaw stability.

8. The aircraft as recited in claim 1 wherein the first outboard section of the wing further comprises a first aerosurface, wherein the second outboard section of the wing further comprises a second aerosurface and wherein, in the wing-borne forward flight mode, the flight control system is operable to control pitch and roll responsive to operation of the first and second aerosurfaces.

9. The aircraft as recited in claim 1 wherein, in the thrust-borne vertical lift mode, the outboard sections of the wing each form an acute minor angle with the dihedral root section of the wing and wherein, in the wing-borne forward flight mode, the outboard sections of the wing each form an obtuse minor angle with the dihedral root section of the wing.

10. The aircraft as recited in claim 1 wherein, during transitions from the thrust-borne vertical lift mode to the wing-borne forward flight mode, the wing transitions from the M-wing configuration to the gull wing configuration.

11. The aircraft as recited in claim 1 wherein, after transitions from the thrust-borne vertical lift mode to the wing-borne forward flight mode, the wing transitions from the M-wing configuration to the gull wing configuration.

12. The aircraft as recited in claim 1 wherein, during transitions from the wing-borne forward flight mode to the thrust-borne vertical lift mode, the wing transitions from the gull wing configuration to the M-wing configuration.

13. The aircraft as recited in claim 1 wherein the flight control system further comprises a remote controlled flight control system.

14. The aircraft as recited in claim 1 wherein the flight control system further comprises an autonomous flight control system.

15. A multi-aircraft system including at least first and second aircraft connectable wingtip-to-wingtip during flight, each aircraft having a thrust-borne vertical lift mode and a wing-borne forward flight mode and each aircraft comprising:
a fuselage;
a wing coupled to the fuselage, the wing having a dihedral root section with first and second outboard ends, a first outboard section pivotable relative to the first outboard end of the dihedral root section and a second outboard section pivotable relative to the second outboard end of the dihedral root section;
a thrust array including a first inboard propulsion assembly coupled between the first outboard end of the dihedral root section and the first outboard section of the wing forming a first pivot axis, a second inboard propulsion assembly coupled between the second outboard end of the dihedral root section and the second outboard section of the wing forming a second pivot axis, a first outboard propulsion assembly coupled to the first outboard section of the wing and a second outboard propulsion assembly coupled to the second outboard section of the wing;
a power system including an engine and a drive system, the drive system including first and second bevel gear sets, the first bevel gear set including an input gear configured to receive torque from the engine, a first output gear rotatable about the first pivot axis and configured to provide torque to the first inboard propulsion assembly and a second output gear configured to provide torque to the first outboard propulsion assembly, the second bevel gear set including an input gear configured to receive torque from the engine, a first output gear rotatable about the second pivot axis and configured to provide torque to the second inboard propulsion assembly and a second output gear configured to provide torque to the second outboard propulsion assembly; and
a female wingtip coupling assembly at the outboard end of the first outboard section;
a male wingtip coupling assembly at the outboard end of the second outboard section; and
a flight control system operably associated with the thrust array, the wing and the wingtip coupling assemblies, the flight control system operable to control thrust output from each of the propulsion assemblies, wing configuration and wingtip coupling;
wherein, in the thrust-borne vertical lift mode, the wing has an M-wing configuration with the center of gravity of the aircraft located between the outboard sections of the wing;
wherein, in the wing-borne forward flight mode, the wing has a gull wing configuration with the center of gravity of the aircraft located below the outboard sections of the wing;
wherein, during transitions between the M-wing configuration and the gull wing configuration, the second output gear precesses about the first output gear changing an angle between the input gear and the second output gear, for both the first and second bevel gear sets; and
wherein, in a connected flight mode, the female wingtip coupling assembly of the first aircraft is coupled to the male wingtip coupling assembly of the second aircraft.

16. The aircraft as recited in claim 15 wherein, during transitions from the thrust-borne vertical lift mode to the wing-borne forward flight mode, the wing transitions from the M-wing configuration to the gull wing configuration.

17. The aircraft as recited in claim 15 wherein, after transitions from the thrust-borne vertical lift mode to the wing-borne forward flight mode, the wing transitions from the M-wing configuration to the gull wing configuration.

18. The aircraft as recited in claim 15 wherein, during transitions from the wing-borne forward flight mode to the thrust-borne vertical lift mode, the wing transitions from the gull wing configuration to the M-wing configuration.

19. The aircraft as recited in claim 15 wherein the flight control system further comprises a remote controlled flight control system.

20. The aircraft as recited in claim 15 wherein the flight control system further comprises an autonomous flight control system.

* * * * *